United States Patent
Gan et al.

(10) Patent No.: US 8,483,055 B2
(45) Date of Patent: Jul. 9, 2013

(54) ADAPTIVE FRAME RATE CONTROL FOR VIDEO IN A RESOURCE LIMITED SYSTEM

(75) Inventors: Christian Gan, Winnipeg (CA); Donald A. Freiling, Winnipeg (CA)

(73) Assignee: Librestream Technologies Inc., Winnipeg MB (CA)

( * ) Notice: Subject to any disclaimer, the term of this patent is extended or adjusted under 35 U.S.C. 154(b) by 197 days.

(21) Appl. No.: 13/106,555

(22) Filed: May 12, 2011

(65) Prior Publication Data

US 2012/0106328 A1    May 3, 2012

Related U.S. Application Data (60) Provisional application No. 61/361,070, filed on Jul. 2, 2010.

(51) Int. Cl.
*G08C 15/00*    (2006.01)

(52) U.S. Cl.
USPC .......................................................... 370/230

(58) Field of Classification Search
USPC .............................................. 370/229–236.1
See application file for complete search history.

(56) References Cited

U.S. PATENT DOCUMENTS

| 7,221,386 B2 | 5/2007 | Thacher et al. | |
|---|---|---|---|
| 7,706,384 B2 | 4/2010 | van Beek | |
| 2004/0264489 A1* | 12/2004 | Klemets et al. | 370/428 |
| 2007/0005804 A1 | 1/2007 | Rideout | |
| 2008/0137541 A1* | 6/2008 | Agarwal et al. | 370/241 |
| 2008/0259799 A1 | 10/2008 | van Beek | |
| 2010/0118114 A1* | 5/2010 | Hosseini et al. | 348/14.09 |
| 2012/0307757 A1* | 12/2012 | Edler Von Elbwart et al. | 370/329 |

FOREIGN PATENT DOCUMENTS

EP    2031807    8/2007

* cited by examiner

*Primary Examiner* — Kerri Rose
(74) *Attorney, Agent, or Firm* — Adrian D. Battison; Ade & Company Inc (57) ABSTRACT

Methods of adaptive frame rate control are provided for compressed video where resources are limited by either network or CPU characteristics. The methods include the determination of the type of compressed video frames to be transmitted or decoded and utilizing the principles of video compression and networking in order to limit the perceived loss of quality of the rendered video to the end user.

27 Claims, 8 Drawing Sheets

ADAPTIVE FRAME RATE CONTROL FOR VIDEO IN A RESOURCE LIMITED SYSTEM

This application claims the benefit of priority under 35 USC 119 from Provisional Application 61/361,070 filed Jul. 2, 2010.

This invention relates to a method of managing the transmission and reception of video signals over a network from a transmitting location to a reception location in a situation where resources for transmission and/or reception of the video signals are limited.

BACKGROUND OF THE INVENTION

A mobile video collaboration system is disclosed in U.S. Pat. No. 7,221,386 (Thacher et al) issued May 22, 2007 which utilizes wired or wireless digital networks for transmitting, in real time, digital video, audio, pictures and other data between a handheld collaboration appliance endpoint and a video conferencing endpoint, the disclosure of which is incorporated herein by reference.

Decoding and streaming encoded video and audio on a mobile video collaboration system presents challenges in being able to provide the end users, either local or remote, a natural experience when rendering video and audio. Two major resources that can greatly affect system performance include network bandwidth as well as the available CPU cycles within the apparatus itself.

The unreliable nature of some digital networks, cellular 3G networks for example, can result in the loss or delay of the digital content being transmitted between the collaboration appliance endpoint and the conferencing endpoint. The delay or loss of content will result in reduced available bandwidth for streaming video and audio and thus result in degraded rendering at the receiving end.

Typical rate control algorithms in packet switched networks use a closed loop reporting system that allows both the sender and receiver to exchange information about the current transfer characteristics. This includes information such as packet loss, packet sequencing and packet jitter. This information is then used to determine which packets to discard when network bandwidth is limited. It is also used to determine whether or not the current network conditions are improving or degrading in order to increase or decrease the traffic flow from the transmitter to the receiver. The problem with the current algorithms is that they are agnostic to the type of data being transferred. A compressed video frame can be contained within a single packet or segmented into multiple packets if its size (in bytes) is greater than the maximum transmission unit (MTU) of the network. The decision to drop a packet within a compressed video frame is essential in that dropping some types of frames will cause significant degradation when rendering. With compressed video, different types of frames exist that make up a group of pictures. A group of pictures begins with an intra-frame or I-frame, and are followed by zero or more inter-frames (e.g. predicted frames or P-frames). An I-frame is a key frame that contains compressed video data that does not require a reference to any other frame and therefore can be decoded in and of itself. Inter-frames however, are difference frames that likely reference previous frames and cannot be properly decoded in and of itself. If a frame is dropped, either partially or in its entirety, inter-frames that follow will likely not have a proper frame reference and therefore result in degraded video in the form of video artifacts or macro blocking when rendered. Because of this, dropping a packet within a frame will have a significant impact on how the entire group of pictures is rendered.

Furthermore, video packet flow control over a network must also take into account the fact that large bursts of packets may also impact performance to other media streams in the system. Real time video compression codecs operate on individual frames as they become available from the video source. The bit stream generated for a frame is typically transmitted over the network as fast as possible which results in a burst of network traffic for each frame. These video bit stream bursts occur at a rate that corresponds to the target frame rate of the video. Generally, even highly compressed video is considered a large consumer of bandwidth on a network.

Some of the negative implications of these network bursts are:

Larger buffers are required at various points in the network stack in order to absorb the bursts.

Some types of network links, like cellular 3G, do not do not handle bursts of traffic as efficiently as they would more constant traffic.

Data packets for other isochronous streams such as voice channels can get bunched up behind bursts of video packets resulting in increased jitter and possibly jitter buffer underflow conditions.

Processor utilization will tend to spike during the packet bursts as the client application and network stack process the bit stream data as fast as possible.

These bursts can starve other threads which will tend to stress software synchronization mechanisms and buffering schemes.

SUMMARY OF THE INVENTION

According to a first aspect of the invention there is provided a method of transmitting and receiving video signals on a packet switched network comprising:

providing a stream of compressed video frames for transmission at a transmitter location;

transmitting from the transmitter location at least some of the compressed video frames over the packet switched network;

receiving and decoding the compressed video frames at a receiver location;

determining network bandwidth characteristics and communicating information concerning the bandwidth characteristics to the transmitter location;

at the transmitter location, calculating an available network bandwidth;

and using the calculated bandwidth to determine an acceptable rate of transmission of the video frames and to make decisions for selecting some of the compressed video frames to be transmitted.

Preferably the network bandwidth characteristics are determined from a data rate and a rate of packet loss.

Preferably the information concerning the bandwidth characteristics is shared between the transmitter location and receiver location through a closed loop reporting method.

Preferably calculation of the frame rate to be transmitted across the network takes into consideration video compression inter and intra frame types as to minimize the degradation of rendering on the receiver and perceived quality of the end user.

Preferably the method includes modifying the rate at which frames are transmitted according to the network characteristic reports received on an ongoing basis.

Preferably the method includes calculating the time between transmitted frames and applying a packet transmission scheduling algorithm to spread the transmission of the frame's corresponding packets in order to alleviate bursting packets onto the network.

Preferably the method includes determining network stability by a system confidence counter.

Preferably the method includes discarding a compressed video frame if there are not enough bytes allocated for transmission of said frame.

Preferably the method includes discarding a compressed video frame if any previous frame in the current group of pictures have been dropped.

Preferably the method includes discarding a compressed video frame if the number of frames already transmitted in the current group of pictures is greater than or equal to the number of frames transmitted in the previous group of pictures multiplied by a configurable factor.

Preferably the method includes discarding a compressed video frame if the amount of allocated bytes for transmission replenished at the start of the group of pictures is less than the size of the I-frame and the current frame is an inter-frame.

Preferably the method includes delaying transmission of packets that make up a frame to be transmitted by the steps of:
  determining the delay time between packets;
  adjusting the time with a spreading factor;
  delaying the transmission of each packet by said delay time;

Preferably the method includes transmitting all remaining packets immediately if the delay time has been exceeded;

According to a second aspect of the invention there is provided a method of transmitting and receiving video signals on a packet switched network comprising:
  providing a stream of compressed video frames for transmission at a transmitter location;
  transmitting from the transmitter location at least some of the compressed video frames over the packet switched network;
  receiving and decoding the compressed video frames at a receiver location including a CPU;
  and dropping frames when decoding the compressed video frames at the receiver location in order to allow higher priority functions in the CPU to have sufficient CPU cycles to perform their respective tasks.

Preferably the method includes providing an algorithm to perform the frame dropping which uses a thread to parse bit stream out of a bit stream buffer.

Preferably the parser thread is set to run at the lowest priority so that all other system functions can not be blocked by it.

Preferably other threads are able to add bit stream data to the parser's bit stream buffer.

Preferably, if the parser has not been given enough CPU cycles to keep up with bit stream decoding, the bit stream buffer will fill.

Preferably, if a call is made to add bit stream data to the bit stream buffer and, if there is no room, the bit stream data is discarded and a small placeholder bit stream segment is added in its place, the placeholder bit stream segment containing a user defined code that notifies the decoder of the skipped frame, wherein the bit stream segment allows the decoder to properly restart the decoding process at the next I-frame, so as to avoid dropped frames causing visual artifacts in the decoded video due to the de-synchronization of reference frames.

Preferably the method includes providing a single thread for adding compressed video frames to a buffer including:
  adding the current frame when there is room in said buffer;
  discarding the current frame when there is not enough room in said buffer;
  and adding a placeholder frame when there is not enough room in said buffer.

Preferably the method includes providing a single thread for consuming compressed video frames from said buffer including:
  setting the priority of said thread to lower than other threads in the system;
  detecting when a placeholder frame is the next frame in said buffer;
  marking a flag to true when said placeholder frame is detected;
  discarding all frames when said flag is true;
  marking said flag to false when an I-frame is detected;
  and decoding all frames when said flag is false or said frame is an I-frame.

By spreading the video bit stream transmission for each frame over the entire frame transmission time, the bursts will flatten in to a more constant flow of video packets. This will mitigate all of the negative points listed above.

The design of a mobile collaboration apparatus must take power consumption into consideration due to the limited battery resources available. This requires the selection of a CPU that is power efficient while being able to provide the CPU cycles to perform the functions of the apparatus. However, the emphasis on power efficiency often comes at the cost of CPU cycles. In a mobile collaboration system, decoding and encoding compressed video requires many CPU cycles, making finding the balance an essential key. If the apparatus is performing many functions simultaneously, there may be situations where the demand for CPU cycles is higher than what is available. In these cases, all functions will suffer performance impacts and result in a poor experience to the end user. In order to alleviate the situation, it may be necessary for the system to reduce the amount of CPU cycles consumed by a single function. Video decoding is one of the areas where CPU cycles can be saved without having a severe impact on the quality of perceived video by the end user. Therefore, it is desirable, as set forth above, to have a mechanism that allows the video decoder to utilize only the CPU cycles not otherwise needed by other functions.

The arrangement described herein therefore identifies two methods for reducing the degradation that results when either network bandwidth or CPU cycle resources are limited:
  Bandwidth Adaptive Streaming (BAS) for compressed video;
  Non-Competitive Video Decoder with Auto Frame Skipping.

A method of video frame rate control on a packet switched network that takes into account network bandwidth characteristics such as data rate and packet loss. This information will be shared between the transmitter and receiver through a closed loop reporting method. Upon receiving these reports from the receiver, the transmitter will calculate the overall available network bandwidth. The calculated rate will then be used to make decisions on which compressed video frames can be transmitted through the network and at what rate. Since compressed video frames must be transmitted as a whole, calculation of the frame rate to be transmitted across the network will take into consideration video compression inter and intra frame types as to minimize the degradation of rendering on the receiver and perceived quality of the end user. The transmitter will modify the rate at which frames are transmitted according to the network characteristic reports received on an ongoing basis. Furthermore, the transmitter will calculate the time between transmitted frames and apply a packet transmission scheduling algorithm to spread the transmission of the frame's corresponding packets in order to alleviate bursting packets onto the network.

A method of dropping frames when decoding compressed video in order to allow higher priority functions to have sufficient CPU cycles to perform their respective tasks. The algorithm developed to perform the frame dropping uses a thread to parse bit stream out of a bit stream buffer. The parser thread is set to run at the lowest priority so that all other system functions can not be blocked by it. Other threads are able to add bit stream data to the parser's bit stream buffer. If the parser has not been given enough CPU cycles to keep up with bit stream decoding the bit stream buffer will fill. If a call is made to add bit stream data to the bit stream buffer and, if there is no room, the bit stream data is discarded and a small placeholder bit stream segment is added in its place. This placeholder bit stream segment contains a user defined code that notifies the decoder of the skipped frame. This allows the decoder to properly restart the decoding process at the next I-frame. Without this mechanism dropped frames may cause visual artifacts in the decoded video due to the de-synchronization of reference frames.

PARAMETER DEFINITION

R is the current rate at which the transmitter can send compressed video frames.

$R_{Max}$ is the maximum data rate of the network.

L is the current packet loss ratio detected and reported by the receiver.

$L_{Max}$ is a configurable value to denote the maximum packet loss ratio to decrease the current rate R when in the DECREASE state.

$L_{Min}$ is a configurable value to denote the minimum packet loss ratio required to transition into the DECREASE state. $L_{Min}$ must be less than $L_{Max}$.

C is a confidence value that is incremented in the STABLE state when current packet loss ratio L is zero. This value is decremented when current packet loss ratio L is greater than zero. It is used to determine if the confidence of the transmitter is high enough to transition into the INCREASE state.

$C_{Max}$ is a configurable value to denote the maximum confidence value required to transition into the INCREASE state.

$I_{Max}$ is a configurable value to denote the maximum factor which R can be increased by in the INCREASE state.

$I_{Min}$ is a configurable value to denote the minimum factor which R can be increased by in the INCREASE state. $I_{Min}$ must be less than $I_{Max}$.

W is the value of the current rate R when transitioning to the DECREASE state. This value is used to determine at what value ($I_{Max}$ or $I_{Max}$) the current rate R can be increased by when in the INCREASE state.

T is the total available bytes for transmission. This value is increased by $T_A$ when a new I-frame is detected. Also referred to as the token bucket.

$T_F$ is the size of the current frame in bytes.

$T_A$ represents the number of bytes to periodically add to T and is calculated by taking the current rate R and multiplying it by the time between the current I-frame and the last I-frame ($t_{AI}$).

$T_P$ is the maximum amount of video frame data that can be transmitted in a single packet.

i_only is a flag that indicates the rate at which T is increasing ($T_A$) is less than the current I-frame.

prev_drop is a flag that indicates that the previous video frame has been dropped.

$N_C$ is the number of transmitted frames within the current group of pictures.

$N_L$ is the number of transmitted frames within the last group of pictures.

$N_M$ is the maximum difference factor between the $N_C$ and $N_L$. I.E. $N_C$ must be less than or equal to $N_L * N_M$.

S is the packet spreading factor. The valid range is 0.0 to 1.0 with 0.0 being a special case in which spreading is effectively turned off since all packets will be sent as fast as possible. A value of 1.0 would use the entire frame delay $t_{AF}$ but this should not be used since it leaves no margin to ensure all packets for a frame are send before the next frame is ready. A value of 0.85 would be reasonable but this can be adjusted based on empirical testing.

N is the number of packets required to transmit a frame of size $T_F$.

t is the current system time.

$t_{AI}$ represents the time between the current I-frame and the last I-frame processed.

$t_{AF}$ represents the time between the current frame and the last frame transmitted.

$t_{AS}$ represents the packet delay after spreading factor S has been applied to $t_{AF}$.

$t_N$ is absolute time when the next packet should be sent based on the system time.

$t_L$ is absolute time when the last packet should be sent based on the system time.

DETAILED DESCRIPTION

Figure 8:
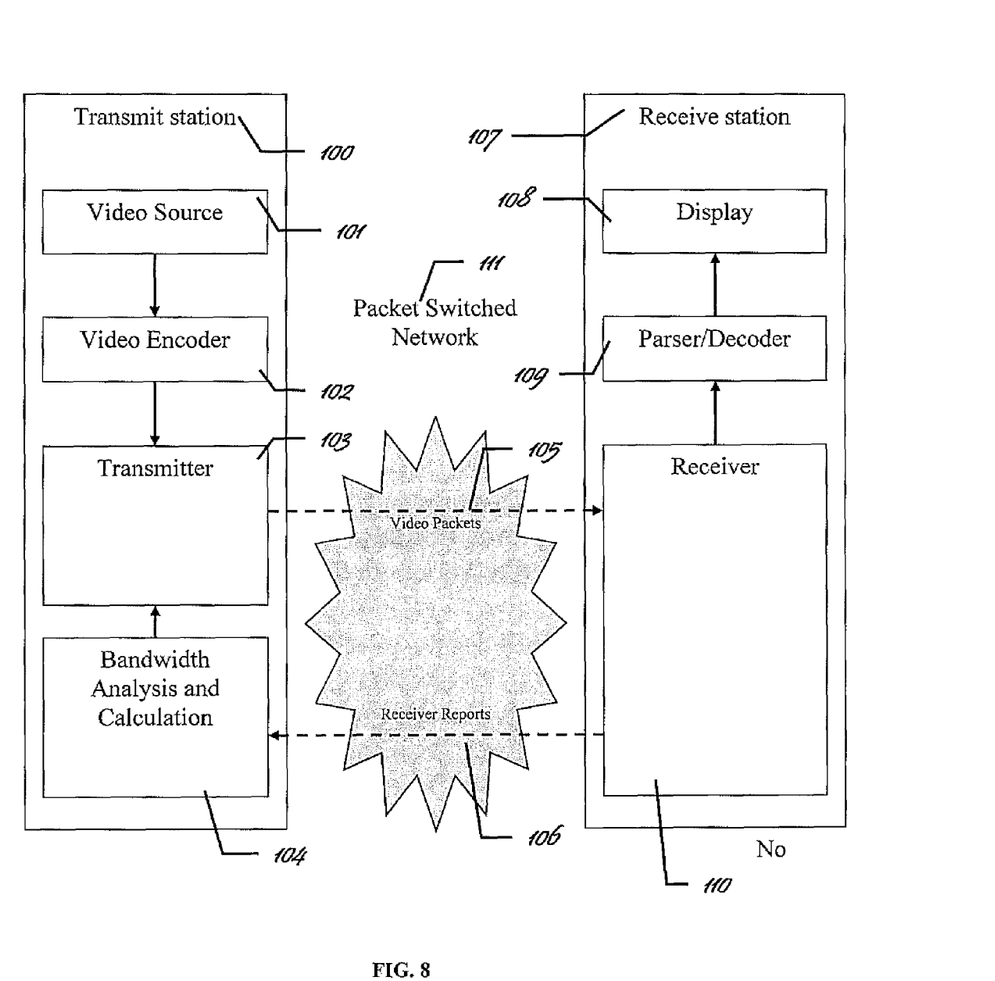
FIG. 8 is a schematic overview of the system.

Turning to the overview of the system shown in FIG. 8, the is shown a method of transmitting video signals and receiving video signals on a packet switched network. The apparatus for carrying out this method includes a transmitting station 100 providing a video source 101 for supplying uncompressed video frames, a video encoder 102 to compress said video frames, and a stream 105 of packetized compressed video frames for transmission at a transmitter 103 over a packet switched network 111.

The apparatus for carrying out this method further includes a receiving station 107 receiving the compressed packetized video frames 105 at the receiver 110 and including a parsing and decoding module 109 that supplies a decoded video signal to a display 108. The receiver 110 is also responsible for periodically calculating and sending statistics reports of packet characteristics of the received video frames back to the transmitter through a dedicated network connection 106. The above systems are generally of a known construction with components and operating programs well known to person skilled in the art.

The system further includes a component 104 arranged for determining network bandwidth characteristics. This is done by analyzing the statistics reports sent from the receiver 110 communicated through a dedicated network connection 106 and analyzing the reports for packet loss data at the transmit station in a manner well known in the art. The data is used to effect calculations in a component 104 relating to an available network bandwidth. The transmit station 100 then uses the calculations from 104 to determine the transmission rate of packets to use in the transmitter 103.

Figure 1:
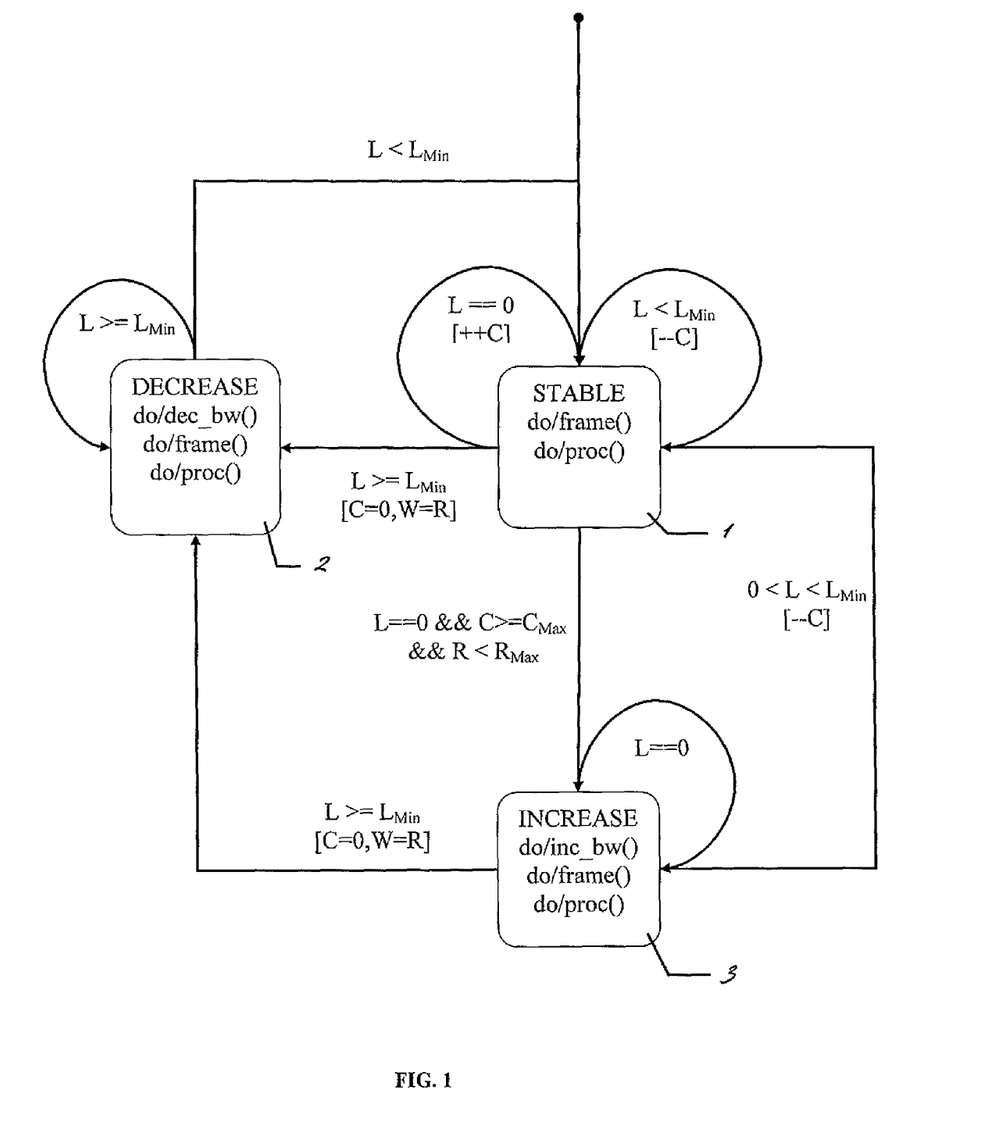
FIG. 1 is the state diagram of the Bandwidth Adaptive Streaming for compressed video which is the method to control video and packet frame rate when transmitting compressed video.

The state diagram for the Bandwidth Adaptive Streaming (BAS) method of video frame rate control is shown in FIG. 1 and applies to the transmitter only. The system initializes in the STABLE state 1. At this stage, a valid network connection has been established between the receiver and transmitter. The transmitter has already begun to generate compressed video from an unspecified source (encoder, file, etc). The value R, which represents the allowable transmission rate, is set to infinity or some large value exceeding the transmission capabilities of the network ($R_{Max}$). The variables T, i_only, and prev_drop are all initialized to zero. Within each state (1, 2, 3), the transmitter and receiver exchange network characteristics reports. Each report contains at a minimum, the packet loss of the transmitted video perceived by the receiver. L is updated with this value when a new report is received. Using this information, R will be adjusted to increase, decrease or remain at the current value depending on the transmitter's current state. The protocol that is used for transmitting both the compressed video data and reports is well known to a person skilled in this art so that detailed explanation is not required here. For example, in a typical video streaming scenario, the Real Time Transport (RTP) protocol is used to carry the compressed video data and the Real Time Control Protocol (RTCP) is used for the exchange of network transfer characteristics.

Referring to FIG. 1, in the STABLE state 1, the transmitter will stay in this state if L is either zero or less than $L_{Min}$, which means that the network conditions are such that packet loss is non-existent or negligible. The function frame( ) (shown in FIG. 2) will be executed for every video frame that is to be transmitted while in this state. If L is zero, a confidence counter C, is increased by one. The transmitter's confidence C is used to determine whether or not the current network conditions are stable enough that an increase to R can be attempted. If L is less than $L_{Min}$, the confidence counter is decreased by one because of the minor packet loss. If after some point L continues to be zero and C is greater than or equal to $C_{Max}$ R is less than $R_{Max}$ the system will transition to the INCREASE state 3. Alternatively, if at any point L is greater than $L_{Min}$, the system will transition to the DECREASE state 2, C is reset to zero and the current rate R is stored in the variable W for later reference. The variable W represents the last rate R where the system was stable. Thus the arrangement above acts to determine network stability by a system confidence counter C, Referring to FIG. 1, in the DECREASE state 2, the transmitter will stay in this state if L is greater than or equal to $L_{Min}$ and the function dec_bw( ) will be executed for each report received in this state. The function frame( ) (shown in FIG. 2) will be executed for every video frame that is to be transmitted while in this state. If at some point, L is less than $L_{Min}$ then the system will transition back to the STABLE state 1.

Figure 3:
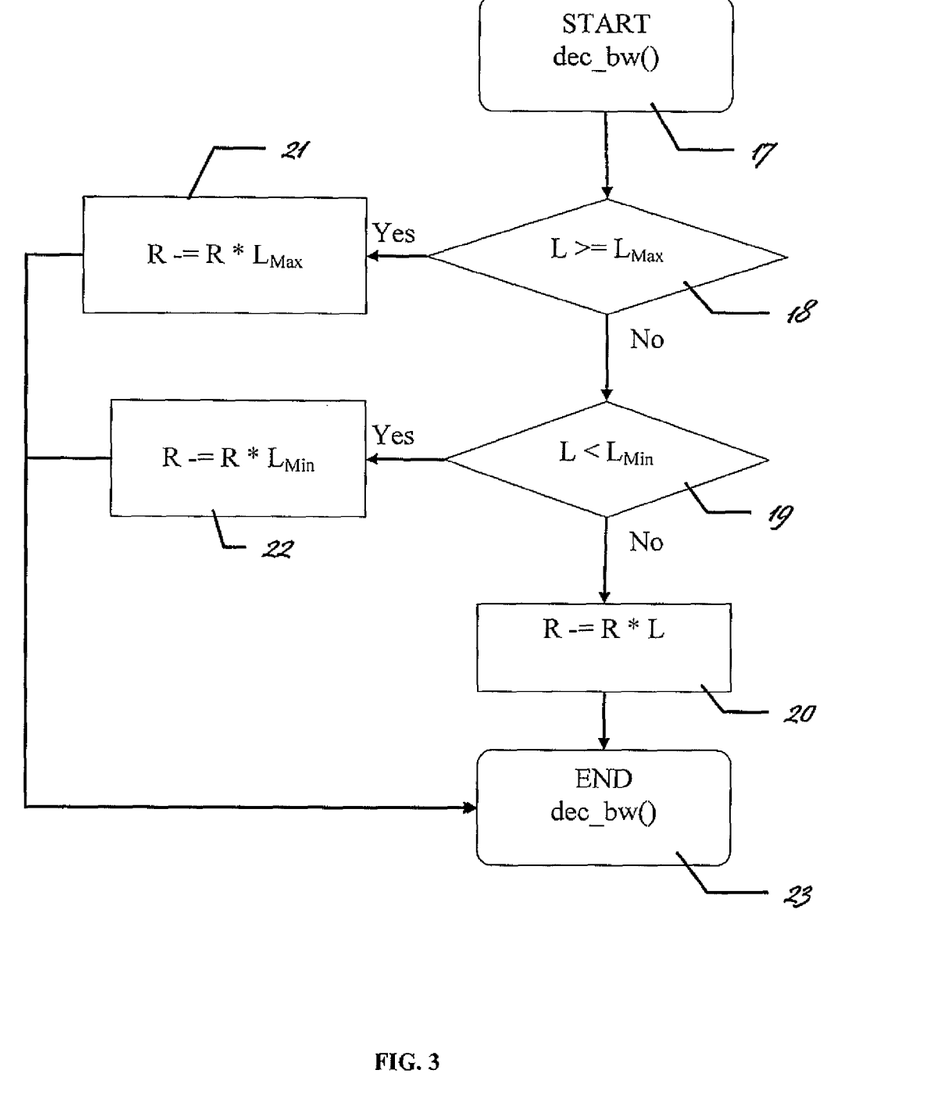
FIG. 3 is a flow chart of the operation of handling rate control when decreasing available bandwidth to send compressed video frames.

Referring to FIG. 3, the dec_bw( ) function 17 is called whenever the transmitter receives a report from the receiver while it is in the DECREASE state 2. In decision 18, if the current packet loss ratio L is greater than or equal to $L_{Max}$, then a new R is calculated at process 21 by multiplying R with the packet loss ratio $L_{Max}$ and subtracting this value from R. Limiting the decrease of R by $L_{Max}$ prevents the transmitter from overreacting to temporary spikes in packet loss, which are prevalent in unreliable networks. $L_{Max}$ is a configurable value between 0.0 and 1.0, with a recommended value of 0.50. In decision 19, if the current packet loss ratio L is less than $L_{Min}$, then a new R is calculated at process 22 by multiplying R with the packet loss ratio $L_{Min}$ and subtracting this value from R. $L_{Min}$ is a configurable value between 0.0 and 1.0 with a recommended value of 0.10. Otherwise a new R is calculated at process 20 by multiplying R with the current packet loss ratio L and subtracting this value from R. The function dec_bw( ) will then exit and return the newly calculated value R at position 23.

Referring to FIG. 1, in the INCREASE state 3, the transmitter will stay in this state if L is equal to zero and the function inc_bw( ) will be executed for each report received in this state. The function frame( ) (shown in FIG. 2) will be executed for every video frame that is to be transmitted while in this state. If L is not zero but less than $L_{Min}$ then the transmitter will transition back to the STABLE state 1 and the confidence value C will be decreased by one. Alternatively, if at any point L is greater than $L_{Min}$, the transmitter will transition to the DECREASE state 3, C is reset to zero and the current rate R is stored in the variable W.

Figure 4:
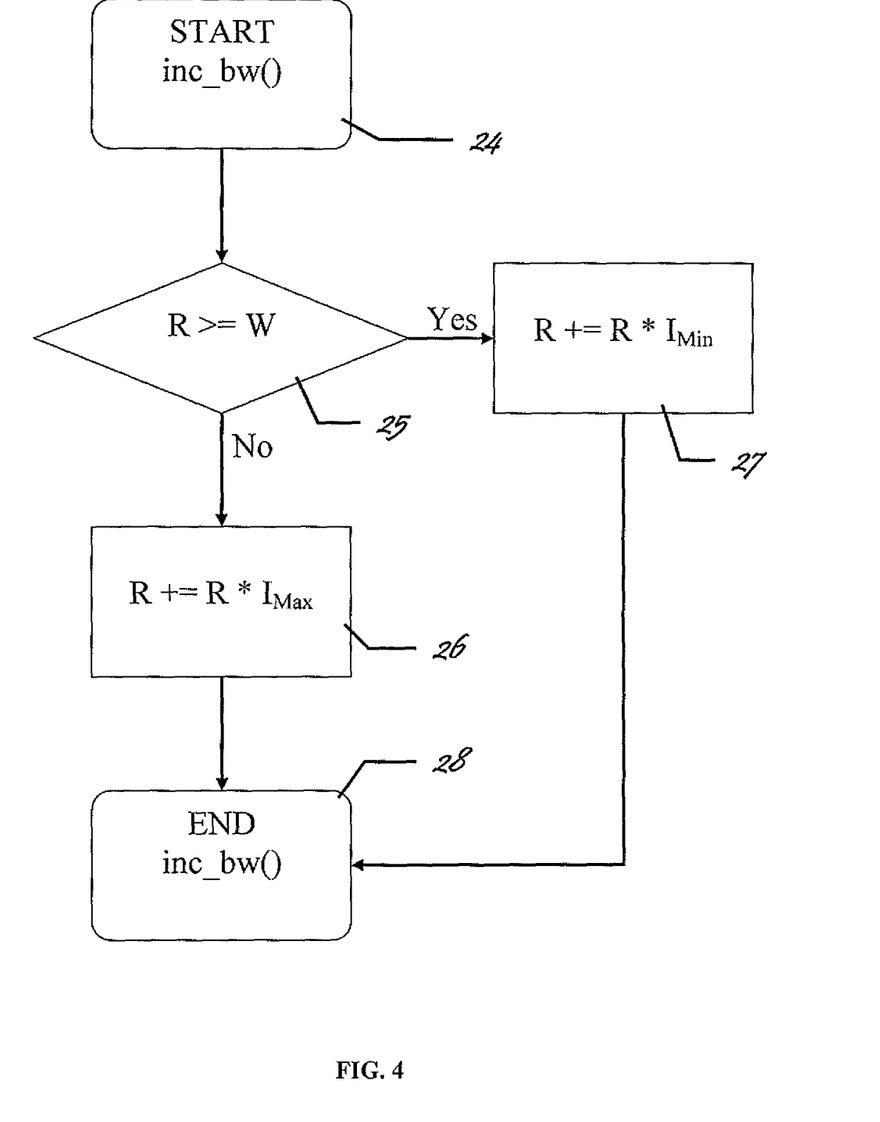
FIG. 4 is a flow chart of the operation of handling rate control when increasing available bandwidth to send compressed video frames.

Referring to FIG. 4, the inc_bw( ) function at start location 24 is called whenever the transmitter receives a report from the receiver while it is in the INCREASE state 2. In decision 25, if the current R is greater than W, a new value of R is calculated at process 27 by multiplying R with the factor $I_{Max}$ and adding this value to R. Otherwise, a new value of R is calculated at process 27 by multiplying R with the factor $I_{Min}$ and adding this value to R. $I_{Max}$ and $I_{Min}$ are configurable values between 0.0 and 1.0 and are recommended to be set to 0.15 and 0.05 respectively. The value W represents the last good R when the transmitter's state transitioned from either STABLE state 1 or INCREASE state 3 to the DECREASE state 2. Since the system was stable when the value W was recorded, this value can be used as a reference to how quickly the value R can be increased. In an unreliable network, packet loss spikes are frequent and are often temporary, so it is likely that the transmitter can try to quickly accelerate R up to W by a factor of $I_{max}$. When R is equal to or greater than W, then a more measured acceleration is required and increments to R are smaller ($I_{Min}$). This is because W may actually be equal to or near the maximum capabilities of the network itself and it may not be possible to increase past R. The function inc_bw( ) will then exit and return the newly calculated value R at end location 28.

Figure 2:
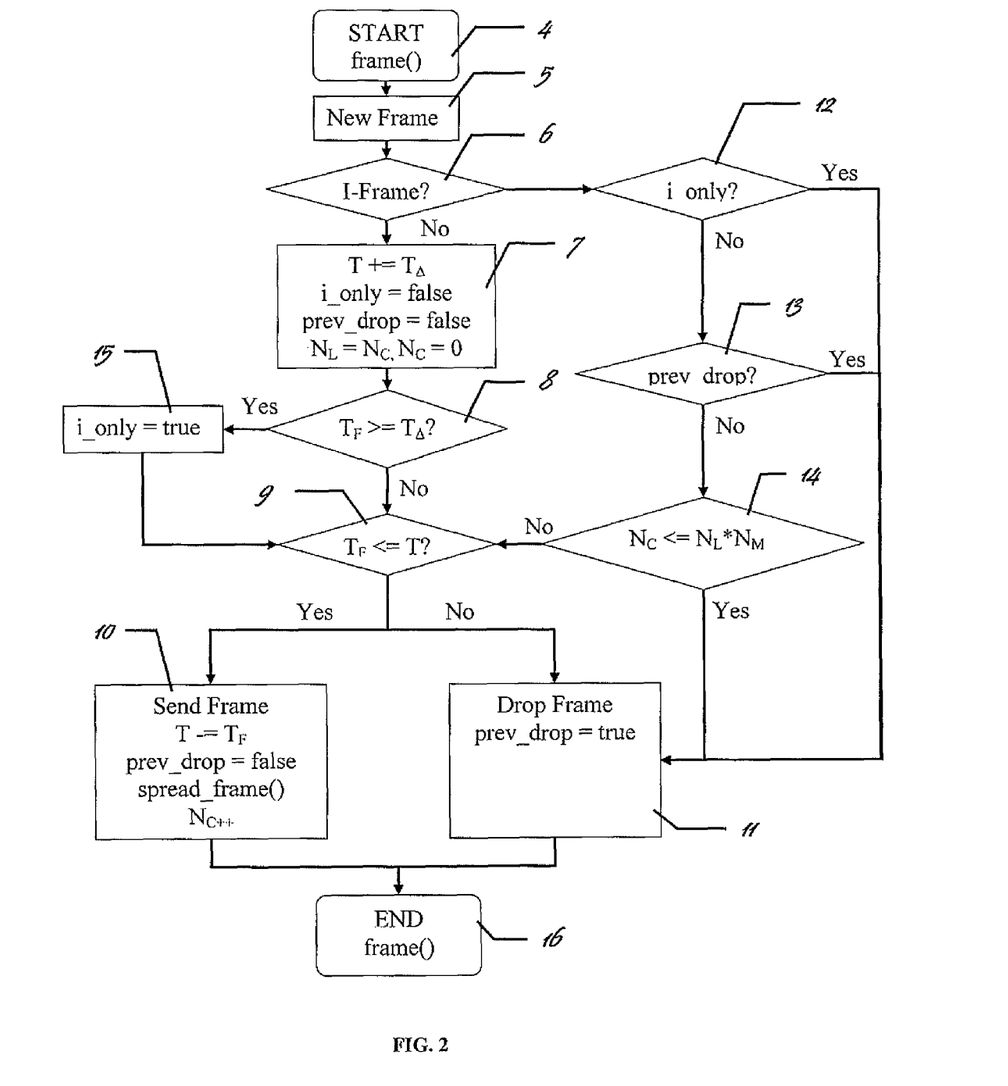
FIG. 2 is a flow chart of the operation of handling a new request to send a compressed video frame.

Referring to FIG. 2, the frame( ) function is executed when a new video frame is queued to be transmitted which can occur while the system is within any state (1, 2, 3). The purpose of this function is to make decisions on whether or not frames should be transmitted or discarded depending the current allowable transmission rate R. The underlying mechanism for flow control is based on a modified token bucket algorithm. In a typical token bucket implementation, tokens are credited and added to a theoretical bucket T. A token is typically represented as a byte but can be any form of system resource. As packet data queues for transmission, the number of tokens in the bucket is reduced by the number of tokens the packet data consumes. If there are no more tokens in the bucket, the packet is discarded. The number of tokens in the bucket is replenished periodically at a defined flow rate R. In this invention, this standard approach is modified to take into consideration that the data packets being transmitted is compressed video and that special care must be taken to decide if a packet or frame is to be discarded. From this point on a token refers to a byte of data in the system and vice versa. Thus the system acts to discard a compressed video frame if there are not enough bytes allocated for transmission of the frame.

After the frame( ) function is called in start location 4, a new frame that is to be transmitted is given to the frame( ) function at position 5. The first step is to determine whether or not the new frame is an I-frame at decision 6. Determining the frame type is dependant on the type of video compression used and is outside the scope of this invention.

If the new frame is an I-frame, i_only and prev_drop are initialized to false in process 7. Also, the number of frames sent in the last group of pictures is recorded in $N_L$ and the current count of frames $N_c$ sent is set to zero. This is done because an I-frame represents a new group of pictures and provides a new reference point to any following inter-frames. A group of pictures is defined as a collection of frames beginning with an I-frame and followed by an unspecified number of inter-frames (e.g. P-frames). $T_A$ is the amount of bytes that are allowed to be transmitted across the network within a time of $t_A$, where $t_A$, is the time between the current I-frame and the last processed I-frame. $T_A$ is calculated by taking the value R and multiplying it by $t_A$. This value is then added to the total number of available bytes for transmission T. In decision 8, if the current frame size $T_F$ is greater than or equal to $T_A$, this means that the amount of bytes added between I-frames is not sufficient enough to be able to send any frames within the current group of pictures. This will continue as long as R is not increased to the point where $T_A$ is greater than $T_F$. In this situation, it is desirable to set the transmitter to only consider I-frames for transmission by setting i_only to true in process 15. By doing this, the bytes in T will be allocated to I-frames in priority over inter-frames.

If the new frame is an inter-frame, some factors must be considered. If i_only is true as determined at process 15, then all inter-frames must be dropped as shown in decision 12. Furthermore, if a previous frame has been dropped (prev_dropped) as determined at process 11, then all following inter-frames must be dropped because they will no longer have a reference to the dropped frame as shown in decision 13. Decoding some inter-frames without a reference may result in degraded video rendering in the form or video artifacts or macro blocking on the receiver. Since inter-frames are typically much smaller than I-frames, they tend to be small enough that they will consume the bytes within T and not leave enough bytes for the next group of pictures. This results in one group of pictures having all or most of its frames transmitted and leaving little bytes in T for the next group of pictures. Therefore it is desirable that each group of pictures transmit and drop nearly the same amount of frames to maintain a smooth transmission of frame data. Decision 14 takes this into account by referencing the amount of frames transmitted in the last group of pictures ($N_L$). The configurable factor $N_M$ is used to determine how many frames can be transmitted in the current group of pictures ($N_C$) relative to the last group of pictures. Where $N_C$ cannot exceed $N_L*N_M$. For example, let $N_L$ equal 1 and let $N_M$ equal 2. Therefore the number of frames transmitted in the current group of pictures cannot exceed 2. If this value is exceeded, the remainder of the frames in the group of pictures are dropped, thereby reserving the bytes in T for allocation to the next group of pictures, which can send up to 4 frames.

Finally, in decision 9, if the current frame size $T_F$ is less than or equal to T, then it is determined that there are enough allowable bytes for transmission and spread_frame( ) is executed in process 10. At this point, T is reduced by the value of $T_F$, $N_C$ is incremented, and prev_drop is set to false. Otherwise, if $T_F$ is greater than T, the frame is dropped and prev_drop is set to true in process 11. After either dropping or sending the current frame, the frame( ) function then exits at end location 16.

As set out above in relation to FIG. 1, this data of the calculated bandwidth is used to determine an acceptable rate of transmission of the video frames and to make decisions for selecting some of the compressed video frames to be transmitted. Thus the value R, which represents the allowable transmission rate, is adjusted to increase, decrease or remain at the current value depending on the transmitter's current state based on the data L concerning the loss of packets which is updated when a new report is received. That is the network bandwidth characteristics are determined from a data rate R and a rate of packet loss L.

As shown in process 7 in FIG. 2, calculation of the frame rate to be transmitted across the network takes into consideration video compression inter-frames (P-frames) and intra frame (I-frames) types as to minimize the degradation of rendering on the receiver and perceived quality of the end user.

As explained in FIGS. 1 and 2, the rate at which frames are transmitted is modified according to the network characteristic reports received on an ongoing basis.

Figure 5:
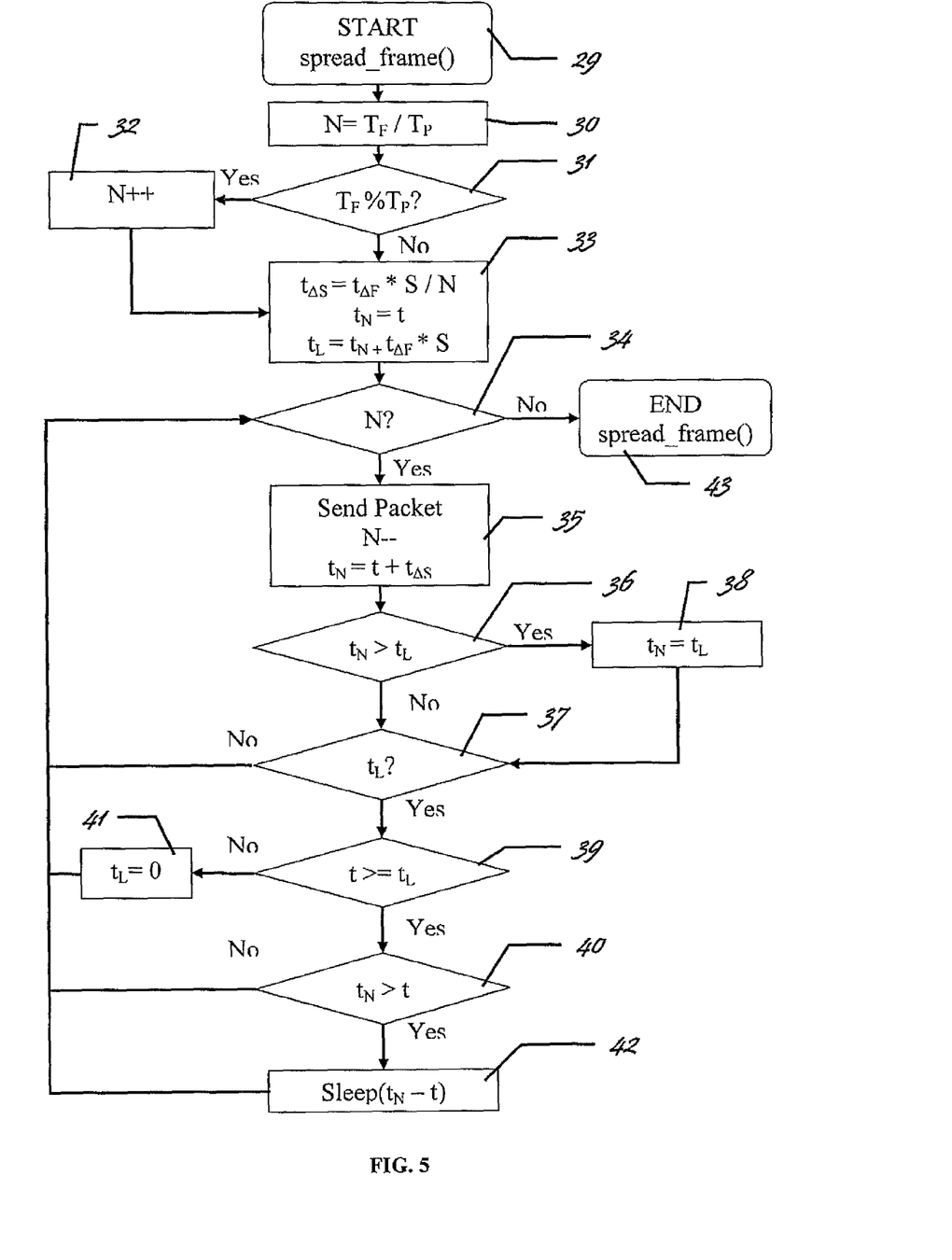
FIG. 5 is a flow chart of the operation of delaying the transmission of individual packets within a frame in order to alleviate bursts on the network.

Referring to FIG. 5, the purpose of spread_frame( ) is to calculate the time between transmitted frames and apply a packet transmission scheduling algorithm to spread the transmission of the frame's corresponding packets in order to alleviate bursting packets onto the network. A large burst of packet data may cause latency and jitter on other network media such as voice streams. In order to limit this, spread_frame( ) introduces a delay based on the spreading factor S to disperse the packets within the actual frame delay of $t_{AF}$. The valid range of the configurable value S is 0.0 to 1.0, with 0.0 being a special case in which spreading is effectively turned off since all packets will be sent as fast as possible. A value of 1.0 would use the entire frame delay $t_{AF}$ but this should not be used since it leaves no margin to ensure all packets for a frame are send before the next frame is ready. A value of 0.85 would be reasonable but this can be adjusted based on empirical testing. For example, if the compressed video is encoded at 10 fps ($t_{AF}$=100 ms) and the spreading factor S is a value of 0.85, then the packets that make up the frame will be spread within 85 ms. So if there are 10 packets (N) that make up the entire frame, then each packet will be sent every 8.5 ms ($t_{AS}$).

After start location 29, process 30 calculates the number of packets N that are required to transmit the current frame. N equals the size of the current frame $T_F$ divided by $T_P$, which is the maximum size of a packet excluding protocol overhead. In decision 31, if there is a remainder, then N is incremented by one at process 32 to account for the extra packet required. Process 33 initializes and calculates $t_{AS}$, $t_N$ and $t_L$. The transmission delay between each packet $t_{AS}$ is determined by multiplying the spreading factor S and the time between the current and last transmitted frame $t_{AF}$ and dividing this number by the number of packets within the frame. The next packet send time $t_N$ is initialized to the current time t for the first packet and the last packet send time $t_L$ is estimated to be the current time plus time it would take to send the entire frame multiplied by the spreading factor S. At decision 34, if the number of packets are greater than zero the function will immediately send the next packet at process 35, decrement N by one and calculate the next packet send time $t_N$ by adding $t_{AS}$ to the current time t. At decision 36, if $t_N$ is greater than the estimated last send time $t_L$, then the next send time is adjusted to be $t_L$, as shown in process 38. At decision 37, if $t_L$ has been previously set to zero (by decision 39 and process 41), the function will immediately attempt to send all the remaining packets by looping through steps 34, 36, and 37. In decision 39, if the current time t is greater than or equal to the estimated last send time $t_L$, then $t_L$ is set to zero in process 41. This will cause decision 37 to always send the next available packet regardless of the scheduled times. The function checks to see if the next send time $t_N$ is greater than the current time t in decision 40. If $t_N$ is greater than t, then the function will sleep for the difference in time in process 42. Thus the transmission of the next packet will be delayed by the amount of time the function sleeps at process 42. Otherwise the next packet will be sent immediately is one exists (decision 34 and process 35). If at any time N is zero at decision 34, then no packets remain for the current frame and the function exists at end location 43.

Figure 6:
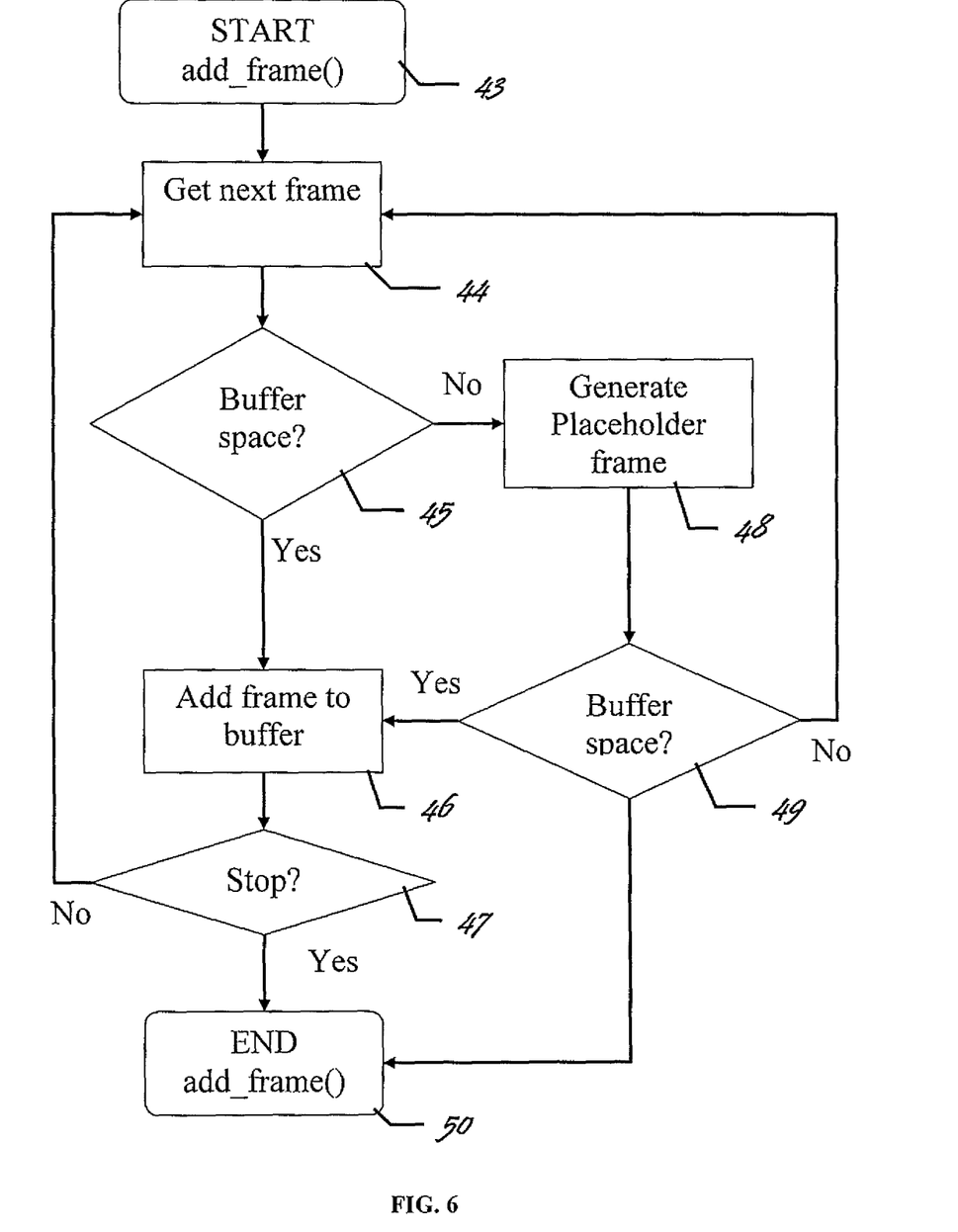
FIG. 6 is a flow chart of the process of adding compressed video frames into a buffer for video decode.
Figure 7:
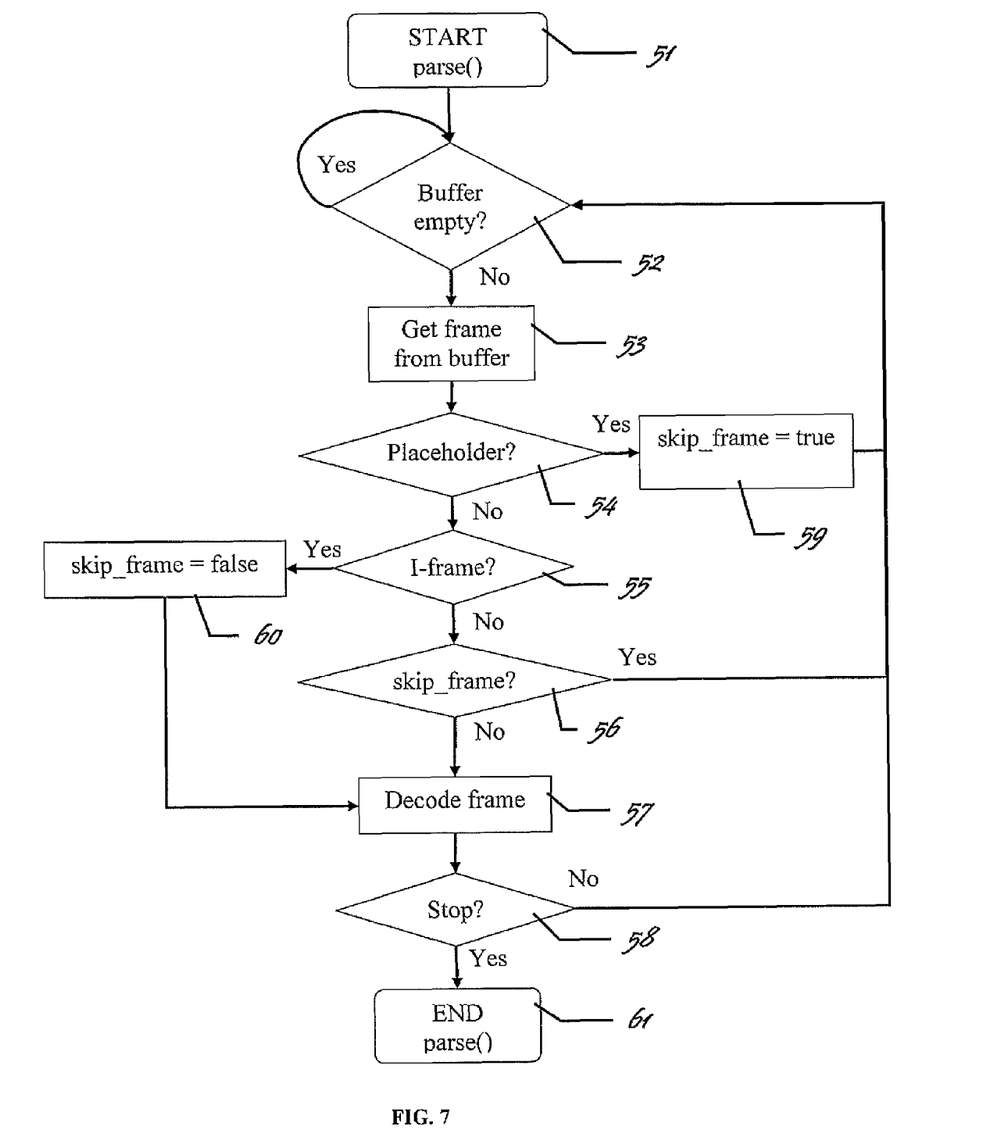
FIG. 7 is a flow chart of the process of retrieving compressed video frames from the buffer for decoding.

FIG. 6 and FIG. 7 shows the processes for the method of dropping frames when decoding compressed video in order to allow higher priority functions to have sufficient CPU cycles to perform their respective tasks. Without this mechanism dropped frames may cause visual artifacts in the decoded video due to the de-synchronization of reference frames.

Referring to FIG. 6, the add_frame( ) function enters at start location 43 and gets the next incoming frame to decode in process 44. If the parser has not been given enough CPU cycles to keep up with bit stream decoding, the bit stream buffer will fill. In decision 45, if there is room in the bit stream buffer, the current frame is added to the buffer in process 46. Otherwise the current frame is discarded and a small placeholder frame is generated process 48. This placeholder is a small bit stream segment that contains a user defined code that notifies the decoder of the skipped frame. The format of the placeholder is dependant on the video compression scheme of the system and is can be determined by a person skilled in this art so that no detailed description is required here. It is required that the placeholder be a valid bit stream according to the video compression scheme that can be consumed by the decoder. For example, in MPEG-4 a user defined frame can be used that begins with a user data start code (00 00 01 B2) and followed by a unique bit stream to indicate that this is a placeholder frame. The decoder will ignore any frames that begins with the user data start code. In decision 49, if there is not enough room in the buffer for the placeholder frame, the placeholder frame is dropped as well and the function will attempt to get the next frame at process 44. Otherwise the placeholder frame is added to the buffer at process 46. At decision 47, if the system has requested the decoding to stop, then the function will exit at end location 50. Otherwise it will continue on to the next frame at process 44.

FIG. 7 shows the flow chart for parse( ) which is the algorithm developed to perform the frame dropping and uses a thread to parse bit stream out of a bit stream buffer. This parser thread is set to run at the lowest priority so that all other system functions can not be blocked by it. From start location 51, in decision 52, the parser thread consumes data in the bit stream buffer at process 53 as long as the buffer not empty. In decision 59, if a placeholder frame is detected by decision 54, the skip_frame flag is set within the decode( ) parser thread in process 59. In decision 56, as long as the skip_frame flag is true, all frames retrieved from the buffer will be dropped. This allows the decoder to properly restart the decoding process at the next I-frame (decision 55) and set the skip_frame flag to false in process 60. That is the system acts to discard a compressed video frame if any previous frame in the current group of pictures has been dropped. If skip_frame is false, then parse( ) function will decode the current frame in process 57. At decision 58, if the system has requested the decoding to stop, then the function will exit at end location 61. Otherwise it will continue on to the next frame at process 52.

As shown in FIG. 8, the receiver 110 is arranged to drop frames when decoding the compressed video frames at the receiver location in order to allow higher priority functions in the CPU to have sufficient CPU cycles to perform their respective tasks. In particular the system provides an algorithm to perform the frame dropping which uses a thread in 109 to parse bit stream out of a bit stream buffer in which the parser thread is set to run at the lowest priority so that all other system functions can not be blocked by it. Other threads are able to add bit stream data to the parser's bit stream buffer. If the parser has not been given enough CPU cycles to keep up with bit stream decoding, the bit stream buffer will fill. If a call is made to add bit stream data to the bit stream buffer and, if there is no room, the bit stream data is discarded and a small placeholder bit stream segment is added in its place, the placeholder bit stream segment containing a user defined code that notifies the decoder of the skipped frame, wherein the bit stream segment allows the decoder 109 to properly restart the decoding process at the next I-frame, so as to avoid dropped frames causing visual artifacts in the decoded video when displayed at 108 due to the de-synchronization of reference frames.

Also the system provides a single thread for adding compressed video frames to a buffer including:
  adding the current frame when there is room in said buffer;
  discarding the current frame when there is not enough room in said buffer;
  and adding a placeholder frame when there is not enough room in said buffer.

Also the system provides a single thread for consuming compressed video frames from said buffer including:
  setting the priority of said thread to lower than other threads in the system;
  detecting when a placeholder frame is the next frame in said buffer;
  marking a flag to true when said placeholder frame is detected;
  discarding all frames when said flag is true;
  marking said flag to false when an I-frame is detected;
  and decoding all frames when said flag is false or said frame is an I-frame.

The invention claimed is:

1. A method transmitting and receiving video signals on a packet switched network comprising:
  providing a stream of compressed video frames for transmission at a transmitter location;
  transmitting from the transmitter location at least some of the compressed video frames over the packet switched network;
  receiving and decoding the compressed video frames at a receiver location;

determining network bandwidth characteristics and communicating information concerning the bandwidth characteristics to the transmitter location;

at the transmitter location, calculating an available network bandwidth;

using the calculated bandwidth to determine an acceptable rate of transmission of the video frames and to make decisions for selecting some of the compressed video frames to be transmitted;

and including determining network stability by a system confidence counter.

2. The method according to claim 1 wherein the network bandwidth characteristics are determined from a data rate and a rate of packet loss.

3. The method according to claim 1 including modifying the rate at which frames are transmitted according to the network characteristic reports received on an ongoing basis.

4. The method according to claim 1 including discarding a compressed video frame if there are not enough bytes allocated for transmission of said frame.

5. A method transmitting and receiving video signals on a packet switched network comprising:

providing a stream of compressed video frames for transmission at a transmitter location;

transmitting from the transmitter location at least some of the compressed video frames over the packet switched network;

receiving and decoding the compressed video frames at a receiver location;

determining network bandwidth characteristics and communicating information concerning the bandwidth characteristics to the transmitter location;

at the transmitter location, calculating an available network bandwidth;

using the calculated bandwidth to determine an acceptable rate of transmission of the video frames and to make decisions for selecting some of the compressed video frames to be transmitted;

and including discarding a compressed video frame if the number of frames already transmitted in the current group of pictures is greater than or equal to the number of frames transmitted in the previous group of pictures multiplied by a configurable factor.

6. The method according to claim 5 wherein a decisions on whether or not frames should be transmitted is based on a modified token bucket algorithm where, as packet data queues for transmission, the number of tokens in the bucket is reduced by the number of tokens the packet data consumes so that if there are no more tokens in the bucket, the packet is discarded;

wherein the number of tokens in the bucket is replenished periodically at a defined flow rate R;

wherein the algorithm takes into consideration that the data packets being transmitted is compressed video and wherein the system acts to discard a compressed video frame if there are not enough bytes allocated for transmission of the frame.

7. The method according to claim 5 wherein the network bandwidth characteristics are determined from a data rate and a rate of packet loss.

8. The method according to claim 5 including modifying the rate at which frames are transmitted according to the network characteristic reports received on an ongoing basis.

9. The method according to claim 5 including discarding a compressed video frame if there are not enough bytes allocated for transmission of said frame.

10. The method according to claim 5 including discarding a compressed video frame if any previous frame in the current group of pictures have been dropped.

11. A method transmitting and receiving video signals on a packet switched network comprising:

providing a stream of compressed video frames for transmission at a transmitter location;

transmitting from the transmitter location at least some of the compressed video frames over the packet switched network;

receiving and decoding the compressed video frames at a receiver location:

determining network bandwidth characteristics and communicating information concerning the bandwidth characteristics to the transmitter location;

at the transmitter location, calculating an available network bandwidth;

using the calculated bandwidth to determine an acceptable rate of transmission of the video frames and to make decisions for selecting some of the compressed video frames to be transmitted;

and including discarding a compressed video frame if the amount of allocated bytes for transmission replenished at the start of the group of pictures is less than the size of the 1-frame and the current frame is an inter-frame.

12. The method according to claim 11 wherein the network bandwidth characteristics are determined from a data rate and a rate of packet loss.

13. The method according to claim 11 including modifying the rate at which frames are transmitted according to the network characteristic reports received on an ongoing basis.

14. The method according to claim 11 including discarding a compressed video frame if there are not enough bytes allocated for transmission of said frame.

15. The method according to claim 11 including discarding a compressed video frame if any previous frame in the current group of pictures have been dropped.

16. The method according to claim 11 wherein a decisions on whether or not frames should be transmitted is based on a modified token bucket algorithm where, as packet data queues for transmission, the number of tokens in the bucket is reduced by the number of tokens the packet data consumes so that if there are no more tokens in the bucket, the packet is discarded;

wherein the number of tokens in the bucket is replenished periodically at a defined flow rate R;

wherein the algorithm takes into consideration that the data packets being transmitted is compressed video and wherein the system acts to discard a compressed video frame if there are not enough bytes allocated for transmission of the frame.

17. A method transmitting and receiving video signals on a packet switched network comprising:

providing a stream of compressed video frames for transmission at a transmitter location;

transmitting from the transmitter location at least some of the compressed video frames over the packet switched network;

receiving and decoding the compressed video frames at a receiver location;

determining network bandwidth characteristics and communicating information concerning the bandwidth characteristics to the transmitter location;

at the transmitter location, calculating an available network bandwidth;

using the calculated bandwidth to determine an acceptable rate of transmission of the video frames and to make decisions for selecting some of the compressed video frames to be transmitted;

and including delaying transmission of packets that make up a frame to be transmitted by the steps of:
determining the delay time between packets;
adjusting the time with a spreading factor;
and delaying the transmission of each packet by said delay time.

18. The method according to claim 17 including calculating the time between transmitted frames and applying a packet transmission scheduling algorithm to spread the transmission of the frame's corresponding packets in order to alleviate bursting packets onto the network.

19. The method according to claim 17 including transmitting all remaining packets immediately if the delay time has been exceeded.

20. A method transmitting and receiving video signals on a packet switched network comprising:
providing a stream of compressed video frames for transmission at a transmitter location;
transmitting from the transmitter location at least some of the compressed video frames over the packet switched network;
receiving and decoding the compressed video frames at a receiver location including a CPU;
dropping frames when decoding the compressed video frames at the receiver location in order to allow higher priority functions in the CPU to have sufficient CPU cycles to perform their respective tasks;
and including providing a single thread for adding compressed video frames to a buffer including:
adding the current frame when there is room in said buffer;
discarding the current frame when there is not enough room in said buffer;
and adding a placeholder frame when there is not enough room in said buffer.

21. The method according to claim 20 including providing an algorithm to perform the frame dropping which uses a thread to parse bit stream out of a bit stream buffer.

22. The method according to claim 21 wherein the parser thread is set to run at the lowest priority so that all other system functions can not be blocked by it.

23. The method according to claim 21 wherein, if a call is made to add bit stream data to the bit stream buffer and, if there is no room, the bit stream data is discarded and a small placeholder bit stream segment is added in its place, the placeholder bit stream segment containing a user defined code that notifies the decoder of the skipped frame, wherein the bit stream segment allows the decoder to properly restart the decoding process at the next I-frame, so as to avoid dropped frames causing visual artifacts in the decoded video due to the de-synchronization of reference frames.

24. A method transmitting and receiving video signals on a packet switched network comprising:
providing a stream of compressed video frames for transmission at a transmitter location;
transmitting from the transmitter location at least some of the compressed video frames over the packet switched network;
receiving and decoding the compressed video frames at a receiver location including a CPU;
dropping frames when decoding the compressed video frames at the receiver location in order to allow higher priority functions in the CPU to have sufficient CPU cycles to perform their respective tasks;
including providing a single thread for consuming compressed video frames from said buffer including:
setting the priority of said thread to lower than other threads in the system;
detecting when a placeholder frame is the next frame in said buffer;
marking a flag to true when said placeholder frame is detected;
discarding all frames when said flag is true;
marking said flag to false when an I-frame is detected;
and decoding all frames when said flag is false or said frame is an I-frame.

25. The method according to claim 24 including providing an algorithm to perform the frame dropping which uses a thread to parse bit stream out of a bit stream buffer.

26. The method according to claim 25 wherein the parser thread is set to run at the lowest priority so that all other system functions cannot be blocked by it.

27. The method according to claim 25 wherein, if a call is made to add bit stream data to the bit stream buffer and, if there is no room, the bit stream data is discarded and a small placeholder bit stream segment is added in its place, the placeholder bit stream segment containing a user defined code that notifies the decoder of the skipped frame, wherein the bit stream segment allows the decoder to properly restart the decoding process at the next I-frame, so as to avoid dropped frames causing visual artifacts in the decoded video due to the de-synchronization of reference frames.

* * * * *